United States Patent
Ben Rached et al.

(10) Patent No.: US 10,901,076 B2
(45) Date of Patent: Jan. 26, 2021

(54) TEMPORAL ANALYSIS FOR USER SPEED ESTIMATION IN WIRELESS NETWORKS

(71) Applicants: Alcatel Lucent, Boulogne Billancourt (FR); INRIA, Le Chesnay (FR)

(72) Inventors: Nidham Ben Rached, Nozay (FR); Veronique Capdevielle, Nozay (FR); Majed Haddad, Le Pontet (FR); Frédéric Ratovelomanana, Nozay (FR); Afef Feki, Antony (FR); Eitan Altman, Cedex (FR)

(73) Assignee: Alcatel Lucent; INRIA, Le Chesnay (FR)

( * ) Notice: Subject to any disclaimer, the term of this patent is extended or adjusted under 35 U.S.C. 154(b) by 448 days.

(21) Appl. No.: 14/904,631

(22) PCT Filed: Jul. 11, 2014

(86) PCT No.: PCT/EP2014/064918
§ 371 (c)(1),
(2) Date: Jan. 12, 2016

(87) PCT Pub. No.: WO2015/004267
PCT Pub. Date: Jan. 15, 2015

(65) Prior Publication Data
US 2016/0146930 A1    May 26, 2016

(30) Foreign Application Priority Data
Jul. 12, 2013    (EP) .................................... 13306001

(51) Int. Cl.
*G01S 11/06* (2006.01)
*H04L 5/00* (2006.01)
(Continued)

(52) U.S. Cl.
CPC ............ *G01S 11/06* (2013.01); *H04L 5/0048* (2013.01); *H04W 24/08* (2013.01); *H04W 72/0413* (2013.01)

(58) Field of Classification Search
CPC ...... G01S 11/06; H04L 5/0048; H04W 24/08; H04W 72/0413
See application file for complete search history.

(56) References Cited

U.S. PATENT DOCUMENTS

| 5,835,846 A | 11/1998 | Furukawa et al. |
| 6,577,603 B1 | 6/2003 | Hakalin et al. |

(Continued)

FOREIGN PATENT DOCUMENTS

| JP | 2002-522771 A | 7/2002 |
| JP | 2003-158779 A | 5/2003 |
| WO | WO 2013/066260 | 5/2013 |

OTHER PUBLICATIONS

International Search Report for PCT/EP/2014/064918 dated Oct. 10, 2014.

(Continued)

*Primary Examiner* — Andrew Lai
*Assistant Examiner* — Harry H Kim
(74) *Attorney, Agent, or Firm* — Fay Sharpe LLP

(57) ABSTRACT

A method for estimating the speed of a user equipment connected to a base station of a wireless network, the method comprising the following steps: measuring the power of a signal transmitted between the user equipment and the base station; computing the derivative of the measured signal power with respect to time; computing the standard deviation of the computed derivative; estimating, from previously established reference data, the speed of the user equipment that corresponds to the computed standard (Continued)

deviation, the reference data associating a given user equipment speed with a certain computed standard deviation.

12 Claims, 2 Drawing Sheets

(51) Int. Cl.
*H04W 24/08* (2009.01)
*H04W 72/04* (2009.01)

(56) References Cited

U.S. PATENT DOCUMENTS

| | | |
|---|---|---|
| 6,680,969 B1 | 1/2004 | Molnar et al. |
| 7,065,375 B2 | 6/2006 | Bonhomme |
| 7,142,850 B1 | 11/2006 | Bokhomme et al. |
| 8,126,404 B2 | 2/2012 | Ben Rached et al. |
| 2003/0054771 A1* | 3/2003 | Chappaz ............ H04L 25/0212 455/67.11 |
| 2004/0097196 A1* | 5/2004 | Ben Rached ......... H04B 17/26 455/67.11 |
| 2007/0259624 A1* | 11/2007 | Alizadeh-Shabdiz ...................... H04W 4/027 455/67.11 |
| 2007/0285245 A1* | 12/2007 | Djuric ................ G08B 21/0275 340/572.1 |
| 2010/0093368 A1* | 4/2010 | Meyer ................... G01S 5/0252 455/456.1 |
| 2013/0005381 A1* | 1/2013 | Turkka ............. H04W 36/0085 455/517 |
| 2013/0217358 A1* | 8/2013 | Snider ............... H04W 12/1202 455/411 |
| 2015/0319720 A1* | 11/2015 | Svedman ............. H04W 52/52 455/522 |

OTHER PUBLICATIONS

Andrea Goldsmith, "Wireless Communications," Cambridge University Press, 2005, pp. 48-53.

* cited by examiner

TEMPORAL ANALYSIS FOR USER SPEED ESTIMATION IN WIRELESS NETWORKS

FIELD OF THE INVENTION

The present invention relates to a method and a system for estimating the speed of a user equipment connected to a wireless network.

BACKGROUND OF THE INVENTION

As used herein, the term "user equipment" is meant broadly and not restrictively, to include any user terminal or, more generally, any device able to connect to a wireless network (a mobile telephone, a personal digital assistant, a smartphone, a tablet computer for example).

By "user speed" is meant here the real speed, of a user or, more generally, of an entity provided with a user equipment attached to a serving base station of the wireless network. For example, the speed of a user provided with a mobile phone, or that of a vehicle including a device connected to a wireless network.

The wireless network may be any cellular or wide-area network (such as WiMAX, 3G, CDMA, LTE or the like) capable of supporting mobility of user equipments connected thereto.

Estimating the user speed is of crucial interest in such wireless networks. Indeed, the user velocity is a key parameter for different wireless network functions including, among others, mobility and radio resource management. Efficiently estimating the user speed has a high impact on wireless network performances and, consequently, the offered quality of service (QoS).

For instance, regarding mobility management, it is straightforward that handover success rate is directly linked to the user speed: the higher the user speed, the higher is handover frequency with greater risk of call dropping (N. Yaakob et al., "*Investigating Mobile Motion Prediction in Supporting Seamless Handover for High Speed Mobile Node*", Proceedings of the International Conference on Computer and Communication Engineering 2008). Accordingly, the optimal adjustment of handover parameters (offsets, hysteresis, timers, and filtering coefficients) should be speed dependent.

The analytical framework proposed by V. Kavitha et al. ("*Spatial Queuing for analysis, design and dimensioning of Picocell networks with mobile users*", Performance evaluation, August 2011) illustrates the dependency of the handover losses and of the cell size on the user speed.

Likewise, as regards radio resource management, the most suitable scheduling scheme, either frequency selective or not, depends on the user velocity. Frequency selective scheduling is generally preferred at low user speeds. Otherwise, due to high Doppler conditions, the frequency dependent channel information is not sufficiently accurate. At high speeds, frequency diverse scheduling is preferable.

Thus, as highlighted above by non-exhaustive examples, accurate information on the user velocity is required for optimizing more than one network mechanism.

Up-to-date, solutions for user speed estimation within wireless networks are inefficient and do not meet the accuracy requirements due to various reasons.

Those based on capturing speed-dependent short term variations of received signal strengths measurements are inefficient when the period of measurements is higher than the coherence duration of these fast variations.

In fact, with regards to the sampling frequency of measurements, prior methods mainly aim at analyzing speed dependent fast fading characteristics: the Doppler frequency is derived from the covariance or the power spectrum of the fast fading channel. But, the Nyquist theorem imposes a high sampling frequency of measurements to avoid spectrum aliasing thus erroneous Doppler estimation. Consequently, these methods are suitable only with short sampling periods. Indeed, large sampling periods (in time) of signals limit significantly the maximum observable Doppler thus the maximum observable UE speed.

Moreover, well known solutions (notably, crossing based methods (Zhang Hong et al., "*Mobile speed estimation using diversity combining in fading channels*", Global Telecommunications Conference, 2004) and covariance based methods (Rosa Zheng Yahong et al. "*Mobile speed estimation for broadband wireless communications over rician fading channels*", IEEE Transactions On Wireless Communications, page 8, jan 2009)) are sensitive to noise, especially for small Doppler spreads. As further problems, most of these solutions need the knowledge of the Signal to Noise Ratio (SNR), are limited to Gaussian noise hypothesis, and are complex to implement.

SUMMARY

Various embodiments are directed to addressing the effects of one or more of the problems set forth above. The following presents a simplified summary of embodiments in order to provide a basic understanding of some aspects of the various embodiments. This summary is not an exhaustive overview of these various embodiments. It is not intended to delineate the scope of these various embodiments. Its sole purpose is to present some concepts in a simplified form as a prelude to the more detailed description that is discussed later.

Some embodiments provide methods and apparatus for estimating the speed of a user equipment that efficiently copes with large periods of signal strength measurements, still by taking profit of large or medium scale variations of measurements. This is particularly advantageous when measured signals are configured with large periods of transmission because of limited capacity constraints.

Some embodiments provide methods and apparatus for continuous and adaptive estimation of the user speed.

Some embodiments provide a speed estimator per-block of signal observations.

Some embodiments provide a computationally efficient and real time method with minimized required memory for estimating the speed of a user equipment connected to a wireless network.

Some embodiments provide methods and apparatus for discriminating the speed class interval of a user equipment amongst more than three adjacent non-overlapping speed class intervals.

Various embodiments relate to methods for estimating the speed of a user equipment connected to a base station of a wireless network, the method comprising the following steps:

measuring the power of a signal transmitted between the user equipment and the base station;

computing the derivative of the measured signal power with respect to time;

computing the standard deviation of the computed derivative;

estimating, from previously established reference data, the speed of the user equipment that corresponds to the computed standard deviation, the reference data associating a given user equipment speed with a certain computed standard deviation.

In accordance with a broad aspect, the above methods further comprise a normalization step of the measured signal power.

In accordance with another broad aspect, the above methods further comprise a filtering step of the measured signal power.

In accordance with another broad aspect, the reference data associates a given user equipment speed with a certain computed standard deviation for a given shadowing decorrelation distance, the shadowing decorrelation distance being relevant to the radio environment of the base station and/or that of the user equipment.

In accordance with another broad aspect, the signal power measurements are performed by the base station on an uplink sounding reference signals transmitted from the user equipment. Alternatively, these signal power measurements may be performed by the user equipment on downlink radio signals transmitted from the base station.

Further, various embodiments relate to a processing unit for estimating the speed of a user equipment connected to a base station of a wireless network, the processing unit comprising
 a module configured to measure the power of a signal transmitted between the user equipment and the base station;
 a module configured to compute the derivative of the measured signal power with respect to time;
 a module configured to compute the standard deviation of the computed derivative;
 a module configured to estimate, from previously established reference data, the speed of the user equipment that corresponds to the computed standard deviation, the reference data associating a given user equipment speed with a certain computed standard deviation.

In accordance with a broad aspect, the above processing unit further comprises a low pass filter for filtering the measured signal power.

Further, various embodiments relate to a base station comprising the above processing unit.

Various embodiments further relate to computer program products for performing the above methods.

While the various embodiments are susceptible to various modification and alternative forms, specific embodiments thereof have been shown by way of example in the drawings. It should be understood, however, that the description herein of specific embodiments is not intended to limit the various embodiments to the particular forms disclosed.

It may of course be appreciated that in the development of any such actual embodiments, implementation-specific decisions should be made to achieve the developer's specific goal, such as compliance with system-related and business-related constraints. It will be appreciated that such a development effort might be time consuming but may nevertheless be a routine understanding for those or ordinary skill in the art having the benefit of this disclosure.

DESCRIPTION OF THE DRAWING

The objects, advantages and other features of various embodiments will become more apparent from the following disclosure and claims. The following non-restrictive description of preferred embodiments is given for the purpose of exemplification only with reference to the accompanying drawing in which

DETAILED DESCRIPTION OF ILLUSTRATIVE EMBODIMENTS

Figure 1:
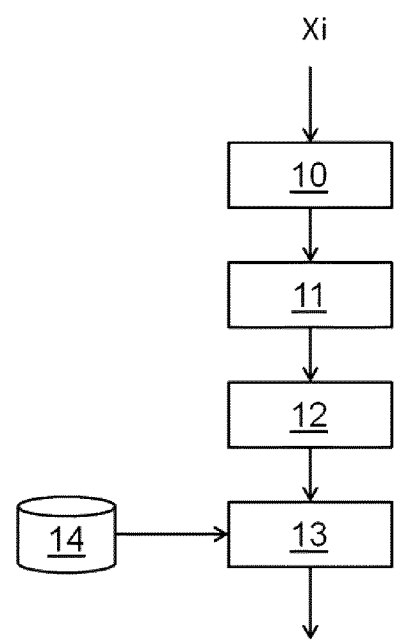
FIG. 1 is a schematic diagram illustrating a flow chart of an embodiment for estimating the user speed per block of signal measurements.

With the aim of providing more realistic propagation channel models, extensive measurement campaigns are performed in different environments (e.g. rural, urban, suburban, indoor/outdoor) and scenarios (e.g. Line-of-sight, Obstructed Line-of-sight, Non-line-of-sight) for statistically modeling signal propagation phenomena (namely, path loss, small-scale and large-scale fading) over wireless channels.

Fading results from the presence of reflectors in the radio environment, which generate multi-paths thus superposition (with different attenuations, delays and phases) of the original signal.

In particular, the large-scale fading—also known as shadow fading or shadowing—arises when the signal variation rate is low, relatively to the period of its use. Amplitude and phase of the received signal do not vary much over the period of use. It originates from obstacles between the base station and the user equipment.

Several measurements have been taken to characterize the empirical correlation of shadowing over distance separating two distinct positions, for different environments and at different frequencies.
 A. Algans et al., "*Experimental analysis of the joint statistical properties of azimuth spread, delay spread, and shadow fading*", IEEE J. Sel. A. Commun. 20, 3, pp. 523-531, September 2006;
 J. Weitzen et al., "*Measurement of angular and distance correlation properties of log-normal shadowing at 1900 MHz and its application to design of PCS systems*," IEEE Transactions on Vehicular Technology, pp. 265-273, March 2002; and
 Gudmundson, M., "*Correlation Model for Shadow Fading in Mobile Radio Systems*", Electron. Lett, Vol. 27, 23, 2145-2146, November, 1991
 are illustrative references for such studies.

In this respect, it has been widely acknowledged that shadowing can be well modeled by lognormal processes. Indeed, because of the shadowing, the correlation of signal strength measurements performed at two distant positions of the user equipment with respect to the base station decreases as the distance $\delta$ separating these two positions increases.

Moreover, the correlation property of the shadowing is modeled by a widely accepted exponential decaying auto-correlation function (said Gudmunsson model: A. Algans et al., "*Experimental analysis of the joint statistical properties of azimuth spread, delay spread, and shadow fading*", IEEE J. Sel. A. Commun. 20, 3, pp. 523-531, September 2006). In other words, the correlation between shadow fading $\psi$ sensed by the base station (eNodeB) for two points separated by distance $\delta$ of the user equipment with respect to the base station can be analytically formulated as follows:

$$\mathcal{R}_\psi(\delta) = \mathbb{E}[(\psi(n-\delta) - \mu_\psi)(\psi(n) - \mu_\psi)] \qquad (1)$$

-continued $$= \sigma_\psi^2 e^{-\frac{\delta}{D}}$$

where $\sigma_\psi^2$ and $\mu_\psi$ are, respectively, the variance and the mean, in dB, of the log-normal shadowing $\psi$;

D is the shadowing decorrelation distance (i.e. the smallest distance separating two measurement positions such that the autocorrelation falls to 1/e).

For a user equipment with speed v, replacing the travelled distance $\delta$ by $v\tau$ ($\tau$ being the travel time of the distance $\delta$) in the above equation (1) gives $$\mathcal{R}_\psi(\tau) = \sigma_\psi^2 e^{-\frac{v\tau}{D}} \quad (2)$$

Furthermore, a received signal r(t) by the base station from the user equipment, with zero mean (i.e. $\mu_r=0$), is considered to be the product of a Rayleigh process and a log-normal exponential process $\psi(t)$ (S. O. Rice, "*Mathematical analysis of random noise*", Bell Syst. Tech. J., vol. 23, pp. 46-156, January 1945). The autocorrelation function of such signal r(t) may be written as follows:

$$R_{rr}(\tau) = \mathbb{E}[r(t-\tau)r(t)] \quad (3)$$

Deriving the above equation with respect to $\tau$, one obtains $$\frac{\partial \mathcal{R}_{rr}(\tau)}{\partial \tau} = \mathbb{E}\left[r(t)\frac{\partial r(t-\tau)}{\partial \tau}\right] \quad (4)$$
$$= -\mathbb{E}[r(t)r'(t-\tau)]$$
$$= -\mathcal{R}_{rr'}(\tau)$$

where r' designates the derivative of r(t) with respect to time t.

Under the assumption of stationarity of the autocorrelation function $R_{rr}$, when deriving again equation (4), one gets $$\frac{\partial^2 \mathcal{R}_{rr}(\tau)}{\partial^2 \tau} = -\frac{\partial}{\partial \tau}\mathbb{E}[r(t+\tau)r'(t)] \quad (5)$$
$$= -\mathbb{E}[r'(t+\tau)r'(t)]$$

which gives from (J. Bendat et al., "Random Data: *Analysis and Measurement Procedures*", Wiley Series in Probability and Statistics, 2010)

$$\frac{\partial^2 \mathcal{R}_{rr}(\tau)}{\partial^2 \tau} = -\mathbb{E}[r'(t+\tau)r'(t)]$$

In particular, the absolute value of the above second derivation of $R_{rr}(\tau)$ when $\tau$ tends to $0^+$ is as follows:

$$\lim_{\tau \to 0^+}\left(\left|\frac{\partial^2 \mathcal{R}_{rr}(\tau)}{\partial^2 \tau}\right|\right) = \mathbb{E}[(r'(t))^2] \quad (6)$$

Now, we consider the case of signal r(t) received by the base station from the user equipment at large period of time (for instance, around 40 ms or more). As example of such signal, one can mention Sounding Reference Signal (SRS) (3GPP Technical Specification 36.211, 'Evolved Universal Terrestrial Radio Access (E-UTRA), Physical Channels and Modulation) which are sent from the user equipment to the base station (eNodeB) for uplink measurement at a relatively large sampling period (generally, with a configurable period typically ranging from 20 ms, 40 ms, 80 ms or more). A vector of signal power measurements r(t) on Sounding Reference Signals is then, advantageously, available on a regular basis.

In such a case, r(t) may be reduced to the large scale fading effect $\psi(t)$ (i.e. shadowing). Therefore, the autocorrelation function of the received signal power $R_{rr}(\tau)$ may be approximated by the autocorrelation function of the shadowing $R_\psi(\tau)$ (that is to say: $\mathcal{R}_{rr}(\tau) \approx \mathcal{R}_\psi(\tau) = \sigma_\psi^2 e^{-\frac{v\tau}{D}}$).

Accordingly, by replacing $R_{rr}(\tau)$ in the equality (6) by the expression of the autocorrelation function of the shadowing $R_\psi(\tau)$ given in equation (1), one obtains:

$$\frac{\partial^2 \mathcal{R}_{rr}(\tau)}{\partial^2 \tau} \approx \frac{\partial^2 \mathcal{R}_\psi(\tau)}{\partial^2 \tau}$$

In other words, with reference to equations (1) and (6), $$\mathbb{E}[(r'(t))^2] \approx \lim_{\tau \to 0^+}\left(\frac{\partial^2 \sigma_\psi^2 e^{-\frac{v\tau}{D}}}{\partial^2 \tau}\right) \quad (7)$$

Thus, the second-time derivative of the autocorrelation function of the shadowing is proportional to the square of the speed, or equivalently, the speed v of the user equipment is proportional to the standard deviation of the derivative of the signal power measurements r(t). It results in an approximate estimate of the user equipment speed v as function of the received signal power r(t):

$$v \approx D\sqrt{\mathbb{E}[(r_N'(t))^2]} \quad (8)$$

where $r_N(t)$ is the normalized received signal power $$r_N(t) = \frac{r(t)}{\sigma_\psi} = \frac{r(t)}{\sqrt{\mathbb{E}[(r(t))^2]}}$$

Given the linear relationship between v and D in equation (8), an error of x % on the shadowing decorrelation distance D induces equally an error of x % on the estimated speed v of the user equipment. Hence, propagation environment-dependent values of the shadowing decorrelation distance D are, preferably, predetermined experimentally and/or theoretically, and then stored to be used for online user speed estimation. In others words, reference data that associate a given user equipment speed with a certain standard deviation in a given radio propagation environment (having a shadowing decorrelation distance D) may be established offline and then utilized online on-demand.

In one embodiment, the speed v of the user equipment is estimated on the basis of the measured signal powers r(t) as follows:

the measured signal powers r(t) are normalized:

$$r_N(t) = \frac{r(t)}{\sqrt{\mathbb{E}[(r(t))^2]}}$$

the derivative of the normalize measurement samples $r_N(t)$ is: $r_N'(t)$;
the variance of the derivative $r_N'(t)$ of the normalized measurement samples $r_N(t)$ is computed: $\mathbb{E}[(r_N'(t))^2]$;
the standard deviation (i.e. square root of the variance) is calculated on subsequent derivatives: $\sqrt{\mathbb{E}[(r_N'(t))^2]}$; then
the obtained value is compared to reference data stored in a database (such as, a lookup table) that is built off-line and provides one-to-one mapping between the standard deviation and the user speed, for a given shadowing decorrelation distance D.

For smoothing fast fading and Doppler variations, the power measurement samples r(t) may, advantageously, be filtered prior to the above procedure steps. As an illustrative example, such filtering step may be achieved through introducing a low pass filter, or through a simple averaging (such as a moving-average process) of the measurement samples $r_N(t)$ prior to the derivative calculation. In fact, smoothing the signal in time domain is preferable, particularly when the measurements processed are insufficiently filtered, or when the measurements samples to process are insufficiently averaged (for example, power measurements over narrow bands instead of wide bands).

In one embodiment illustrated in FIG. 1, the above described method is deployed so that estimating the user speed per block of measurement samples, resulting in a per-block speed estimator. To that end, the above-described method is carried out on a predefined number N of measured signal powers as follows:
- a set (i.e. a block) of measurement samples $X_i=[x_{i+1}, \ldots, x_{i+N}]$ (a vector of N samples) is normalized (step 10 in FIG. 1): for each element k, $x_k=x_k/\sqrt{\text{norm}(X_i)}$ Where norm stands, for example, for the two-norm operation;
- a derivation of the normalized vector is computed (step 11 in FIG. 1). As illustrative examples of derivation operators, one can mention those based on Lagrangian interpolation polynomial functions, or those described in (Francois Auger, Zoheir Boulbair, Frederic Miqueau, "*Estimation par maximum de vraisemblance de la dérivée d'un signal bruité: Application à la caractérisation de vérins pneumatiques*", 19ème Colloque sur le traitement du signal et des images, GRETSI 2003);
- computation of the square root of variance of derivatives, said dispersions (step 12 in FIG. 1): the dispersion $Disp_i$ is computed per block i, from the set of all derivatives $d_k$ in $d_i$ ($d_i$ being the set of all derivatives $\{d_k\}$, calculated on block i) to quantify the dispersion of these derivatives. It is obtained from an empirical estimation of the variance on the derivatives, according to the following equation:

$$Disp_i = \sqrt[2]{\frac{1}{K} \cdot \sum_{k=1}^{K}(d_k - m)^2}$$

K being the number of derivatives computed on block i;
m being the mean value over these K derivatives comparison (step 13 in FIG. 1) with the database 14: the estimated dispersion is compared to the content of a database 14 (i.e. a lookup table) that provides one-to-one mapping between the speed and the computed dispersion $Disp_i$, for a given shadowing decorrelation distance D. The speed that corresponds to the closest dispersion from this data base is then the estimated user equipment speed v.

In one embodiment, the derivative at order 1 for each element k in block i ($X_i=[x_{i+1}, \ldots x_k, \ldots, x_{i+N}]$), i>k>N) is computed on mean values over temporal blocks of samples as follows:

$$d_k = \frac{(E[x_k] - E[x_{k-n}])}{n \cdot T}$$

where n is the delay between the two points of derivation, T is the measurements sampling period and $E[x_k]$ is the mean value computed over a block k of temporal samples.

Likewise, a derivative at order 3 may be computed for each element k in block i ($X_i=[x_{i+1}, \ldots x_k, \ldots, x_{i+N}]$), i>k>N) as follows ($d_i$ being the set of all derivatives $\{d_k\}$ calculated on block i).

$$d_k = \frac{1}{4}(6 \cdot E[X_k] - E[X_{k-n}] - 2 \cdot E[X_{k-2n}] - 3 \cdot E[X_{k-3n}])/(3n \cdot T)$$

Advantageously, the above derivatives enable to further smooth the signal, thus reduce fast fading, Doppler variations, in order to capture the slow variations of shadowing, only.

Figure 2:
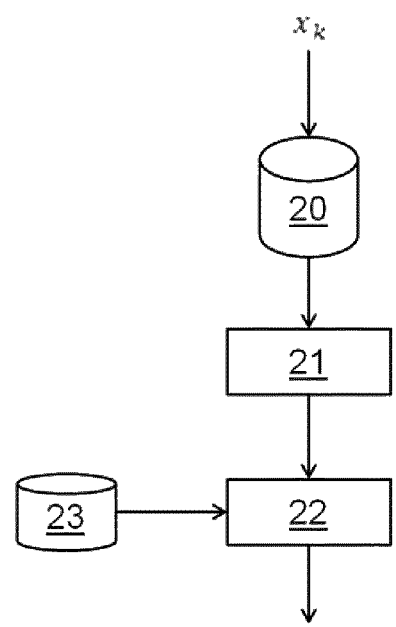
FIG. 2 is a schematic diagram illustrating a flow chart of an embodiment for user equipment speed tracking.

In an alternative embodiment illustrated in FIG. 2, the above described method is deployed so that estimating the user speed adaptively for each new measurement per block of measurements, leading to an adaptive speed estimator. The above-described steps for a per-block speed estimation are updated at each new signal power measurement while using the most recent N−1 previous measurements already available, in order to track the speed of the user equipment. In fact, instead of waiting for successively measuring a 'block' of samples $X_i=[x_{i+1}, \ldots, x_{i+N}]$ for computing the dispersion $Disp_i$, the dispersion is updated each time a new $x_k$ sample is available.

In fact,
- a new sample $x_k$ is stored in a circular buffer of size $\underline{n}$ (or $3\underline{n}$ in the case of a derivative at order 3) (step 20 in FIG. 2);
- the derivative $d_k$ is computed by recursive filtering, accounting for the new input value (step 21 in FIG. 2): derivative computed from the new sample. As illustrative example, for a derivative at order 1, $$d_k = \alpha \cdot d_{k-1} + (1-\alpha) \cdot \frac{(X_k - X_{k-n})}{\varepsilon_k},$$

$0 \leq \alpha \leq 1$ ($\alpha$ is close to 1);
- dispersion is updated and speed estimated by database 23 lookup (step 22 in FIG. 2).

Advantageously, an adaptive speed estimator enables speed tracking: speed estimated at the rate of each new samples arrival. Additionally, the computational cost of its implementation is quite low, which favors its deployment in real networks.

The user speed may be estimated from a set of radio signal power measurements which may be performed either by the serving base station on uplink sounding reference signals or alternatively (given the symmetry of the radio propagation channel) by the user equipment on downlink signals. Accordingly, these measurements may be performed based on downlink or uplink physical signals, then processed as described above by means of dedicated processing units. Such processing units may be comprised in the base station (an eNodeB for LTE and beyond), in the user equipment or in any other system to which the measured signal powers are reported.

Figure 3:
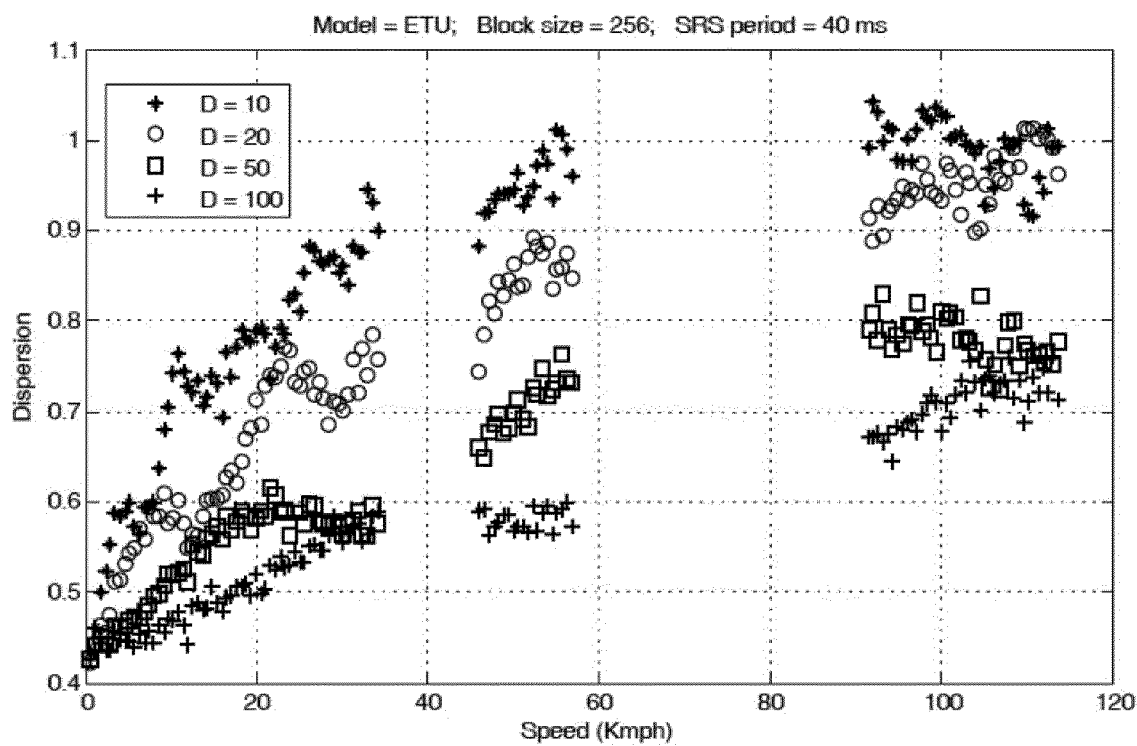
FIG. 3 illustrates the dependence between the speed and the decorrelation distance.

FIG. 3, in which is plotted the dispersions $$Disp_i = 2\sqrt{\frac{1}{K} \cdot \sum_{k=1}^{K} (d_k - m)^2}$$

(with reference to equation 8) in function of speed v for different decorrelation distance D, highlight that the dispersion Disp is a linearly increasing function of the speed v. Moreover, this dispersion Disp increases for decreasing D, as it is expected from the inverse proportionality between D and Disp, pointed out by equation 8.

Accordingly, it is preferable to store in a database previously established reference data associating a given user equipment speed with a certain computed dispersion $Disp_i$ (i.e. the standard deviation) for a plurality shadowing decorrelation distance D relevant to different radio propagation environments.

It is to be further noted that the above-described method permits to discriminate the user speed class interval. In particular, according to simulations results, with 11 classes, the probability for a correct classification, including adjacent classes is about 90%, whatever the decorrelation distance D is.

Advantageously, profiting by the relatively large sampling period (generally around 40 ms or more) of sounding reference signals, the variation speed of the slow fading (i.e. large scale fading) is utilized to estimate the real speed of the user. In fact, the slow fading variations (medium and large scale variations) are more or less rapid depending on the user velocity for estimating the real speed.

Figure 4:
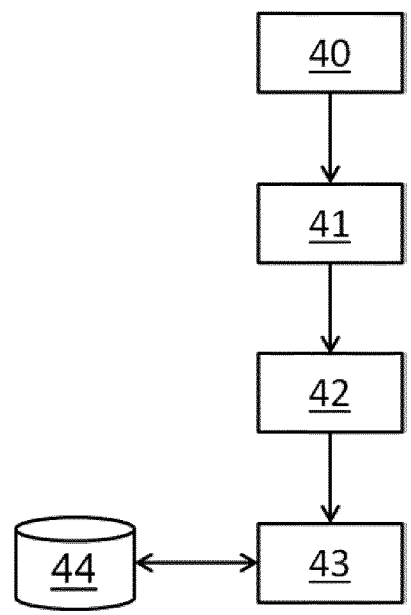
FIG. 4 is a block diagram illustrating functional modules of some embodiments.

FIG. 4 shows a processing unit for estimating, as described above, the speed of user equipment connected to a base station of a wireless network. The processing unit comprises a module 40 configured to make a set of measurements of the power of a signal transmitted between the user equipment and the base station;

a module 41 configured to compute the derivative of the measured signal power with respect to time;

a module 42 configured to compute the standard deviation of the computed derivative;

a module 43 configured to estimate, from previously established reference data within a database 45 (i.e. a lookup table), the speed of the user equipment that corresponds to the computed standard deviation, the reference data associating a given user equipment speed with a certain computed standard deviation.

The disclosed embodiments efficiently cope with large periods of signal strength measurements, by taking profit of correlation properties of slow fading. The computational cost of the proposed method for user speed estimation is very low. An adaptive implementation thereof is easily tractable in real networks, with very limited impact on CPU.

Moreover, the disclosed method and system, advantageously, permit to estimate the velocity of any user equipment connected to a base station (eNodeB) without any additional overhead. In fact, the sounding reference signals (SRS) transmitted by the UE are already specified by the 3GPP LTE (3GPP Technical Specification 36.211, Evolved Universal Terrestrial Radio Access (E-UTRA), Physical Channels and Modulation).

Further, the above-described method and system for user speed estimation, advantageously, enable speed tracking from measurements at large periodicity, while restricting significantly the impact on CPU.

According to an aspect of the disclosed embodiments, the speed class of the user equipment may be estimated on the basis of real time measurements in wireless access network such as 3G, LTE or beyond.

It is to be noted that in the above-described embodiments the user speed is supposed to be averagely constant or slowly variable in time, but they remain valid for time-variant user speed while taking into account this dependency (notably, in equations 2, 7 and 8).

The invention claimed is:

1. A method for estimating a speed of a user equipment connected to a base station of a wireless network, the method comprising:

measuring a power of a signal transmitted between the user equipment and the base station;

computing a time derivative of the measured signal power, said time derivative representing a rate of change of the measured signal power with respect to time;

computing a standard deviation of the computed time derivative to achieve a result;

comparing the result to reference data established prior to said measuring, said reference data associating given user equipment speeds with given standard deviations; and estimating, based on an outcome of said comparing, the speed of the user equipment.

2. The method of claim 1, further comprising a normalization of the measured signal power.

3. The method of claim 1, further comprising a filtering of the measured signal power.

4. The method of claim 1, wherein the method is being carried out on a predefined number of measured signal powers.

5. The method of claim 4, wherein the method is updated at each signal power measurement, in order to track the speed of the user equipment.

6. The method of claim 1, wherein the reference data provides a one-to-one mapping of the given user equipment speeds to the given standard deviations for a given shadowing decorrelation distance, the shadowing decorrelation distance being relevant to the radio environment of the base station.

7. The method of claim 1, wherein the signal power measurement is performed by the base station on an uplink signal transmitted from the user equipment.

8. The method of claim 1, wherein the transmitted signal between the user equipment and the base station is a sounding reference signal.

9. A processor that estimates a speed of a user equipment connected to a base station of a wireless network, the processor being operative to:

measure a power of a signal transmitted between the user equipment and the base station;

compute a time derivative of the measured signal power, said time derivative representing a rate of change of the measured signal power with respect to time;

compute the standard deviation of the computed time derivative to achieve a result;

comparing the result to reference data established prior to said measuring, said reference data associating given user equipment speeds with given standard deviations; and estimate, based on an outcome of said comparing, the speed of the user equipment.

10. The processor of claim 9, further comprising a low pass filter for filtering the measured signal power.

11. A base station of a wireless network, said base station comprising a processor that estimates a speed of a user equipment connected to the base station, the processor being operative to:

measure a power of a signal transmitted between the user equipment and the base station;

compute a time derivative of the measured signal power, said time derivative representing a rate of change of the measured signal power with respect to time;

compute the standard deviation of the computed time derivative to achieve a result;

compare the result to reference data established prior to the signal power being measured, said reference data associating given user equipment speeds with given standard deviations; and estimate, based on an outcome of said comparing, the speed of the user equipment.

12. A non-transitory computer readable medium including a computer program thereon, the computer program including code sections for performing instructions when executed on a processor, said instructions including instructions for:

measuring a power of a signal transmitted between a user equipment and a base station of a wireless network;

computing a time derivative of the measured signal power, said time derivative representing a rate of change of the measured signal power with respect to time;

computing a standard deviation of the computed time derivative to achieve a result;

comparing the result to reference data established prior to said measuring, said reference data associating given user equipment speeds with given standard deviations; and estimating, based on an outcome of said comparing, the speed of the user equipment.

\* \* \* \* \*